United States Patent

Baum et al.

[15] 3,652,876

[45] Mar. 28, 1972

[54] DATA TRANSMISSION SYSTEM, UTILIZING AC LINE FREQUENCY AS CLOCK

[72] Inventors: Elliot Baum, Dix Hills; Harry R. Loewengart, New York, both of N.Y.

[73] Assignee: Quasar Microsystems, Inc., Brentwood, N.Y.

[22] Filed: Apr. 30, 1970

[21] Appl. No.: 33,294

[52] U.S. Cl...............................307/262, 178/69.5, 307/235, 307/236, 307/251, 307/269, 307/288, 307/313, 328/63

[51] Int. Cl.........................................H03k 1/12, H03k 17/60

[58] Field of Search..................307/205, 208, 236, 251, 255, 307/262, 269, 279, 288, 289, 304, 313, 235; 328/63, 74, 179, 201, 115, 150; 178/69.5; 329/109

[56] References Cited

UNITED STATES PATENTS 3,364,429 1/1968 Jensen....................................307/313

3,408,512 10/1968 Raisanen.............................307/289 X 3,246,176 4/1966 Nazareth, Jr........................307/304 X

OTHER PUBLICATIONS

Simek et al., Receiver Synchronizing Circuit, IBM Technical Disclosure Bulletin, Vol. 7, No. 12, May 1965, pp. 1185, 1186.

*Primary Examiner*—Stanley T. Krawczewicz
*Attorney*—Sandoe, Hopgood & Calimafde

[57] ABSTRACT

A data transmission system is described in which bipolar data signals are derived from an AC signal. The system comprises a transformer having a primary winding receiving the AC signal and a secondary winding. The ends of the secondary winding are respectively connected to switch means the control terminals of which receive data signals. The bipolar signal derived at the center tap of the secondary winding reflects the data signal inputs to the switch means.

10 Claims, 2 Drawing Figures

Figure 1:
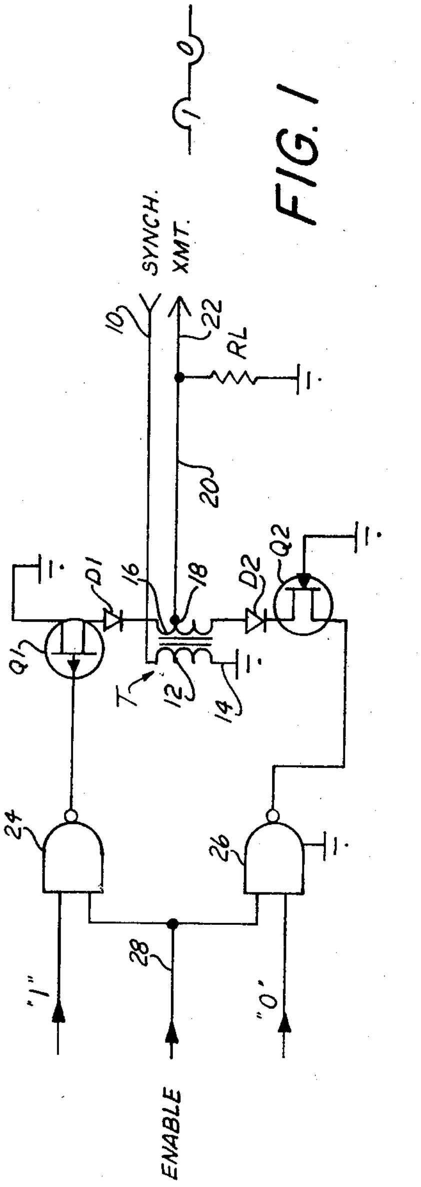

INVENTORS
ELLIOT BAUM
HARRY LOEWENGART
BY
Sandoe, Hopgood & Calimafde
ATTORNEYS

DATA TRANSMISSION SYSTEM, UTILIZING AC LINE FREQUENCY AS CLOCK

The present invention relates generally to data transmission systems, and particularly to a system for transmitting data and synchronizing signals between two or more terminals in a multi-terminal digital computer system.

In a computer system it is often necessary to transmit data between one computer terminal and one or more other terminals in the system. An example of a multiple-terminal computer system is a system having a central or "master" computer terminal which transmits data to a plurality of "slave" computer terminals, the latter thus all reflecting information computed at the former. A typical application of such a multi-terminal would be a computerized cash register system in which transactions are recorded at a plurality of remote terminals, the data from those terminals then being transmitted to a central-master computer which performs the computations for each terminal transaction, and maintains a continuous record of sales, inventory, and the like. To ensure proper synchronization of operation of all the remote slave terminals with the master computer terminal, suitable synchronizing signals must also be transmitted between the master and slave computer terminals.

In the known computer systems of this type, separate equipment is required to produce the necessary data and synchronizing signals. Since it is common for a single master computer terminal to provide data signals for 50 or more slave terminals, that data transmission equipment must be capable of supplying a significant amount of power to ensure proper signal levels at each of the receiving terminals.

As a result, the conventional data signal transmitting equipment used in these systems is of necessity complex, expensive and relatively unreliable in view of the stringent reliability requirements for such systems. Should there be a failure in a conventional multi-terminal computer system resulting in an interruption of the synchronizing signals, the master-transmitter and the slave-receiver terminals are likely to go out of synchronization, causing the system to perform improper data processing operations.

As a result of the above described limiting features of the known data transmission systems, it has heretofore not been possible to obtain a relatively inexpensive and yet fully reliable computer data transmission system between the various terminals of a multi-terminal computer system. Many potential users of multi-terminal computer systems have, as a result, been unable or reluctant, to make use of such systems for applications in which they could otherwise be used to advantage.

It is an object of the present invention to provide a data transmission system which is significantly less complex, and hence less costly than the known systems of this type.

It is a further object of the present invention to provide a data transmission system in which data and synchronizing signals are derived from the available AC line normally used to provide operating power to the system.

It is another object of the present invention to provide a multi-terminal computer system in which there is no longer a requirement for separate data transmission equipment.

It is still another object of the present invention to provide a data transmission system of the type described which has significantly increased reliability over the known systems of this type.

It is yet another object of the present invention to provide a data transmission system of the type described in which synchronism is not adversely affected upon the interruption of signal transmission.

In the data transmission system of this invention, the data signals are produced from the AC signal derived from the conventional AC power source, commonly at a frequency of 60 Hz. The AC line signal is applied to the primary winding of a transformer, and a center tap is provided in the secondary winding of that transformer. Switch means are operatively connected between the two ends of the secondary winding and a reference point which may conveniently be at ground. The control terminals of the switch means respectively receive data signals at either the logic "1" or logic "0" level. Depending on which data signal is present, one of the switch means is selectively turned on while the other switch means remains off, so that one end of the secondary becomes effectively connected to ground. The signal at the center tap is of a polarity corresponding to which of the switch means is actuated and thus of the switch means-actuating data signals. The data signal is thus in the form of a train of either positive or negative half-wave portions of the AC line signal, corresponding to the binary information that is to be transmitted.

Also disclosed is a receiver section for receiving these AC signal-derived data signals and for reconstituting those signals into the more conventional pulse form for subsequent use in the receiver terminal.

Figure 2:
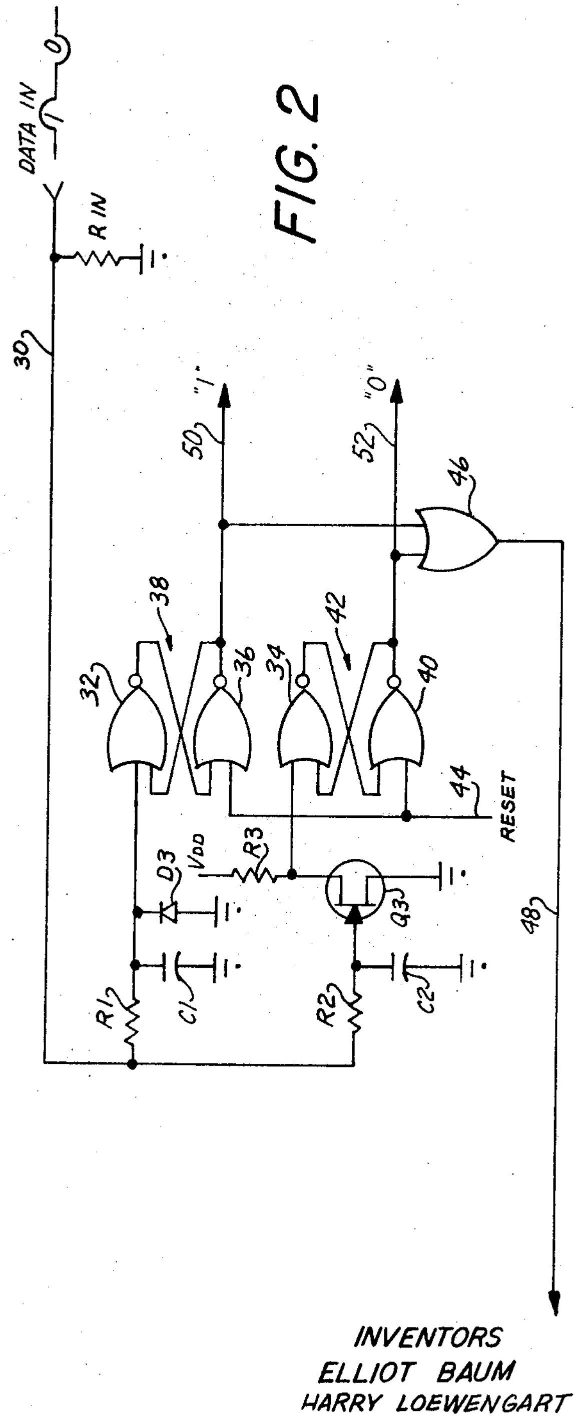

To the accomplishment of the above and to such further objects as may hereinafter appear, the present invention relates to a data transmission system as defined in the appended claims, and as described in the following specification taken together with the accompanying drawing in which:

FIG. 1 is a schematic circuit diagram of a data transmission system embodying features of the invention; and FIG. 2 is a schematic circuit diagram of a data receiver for processing data signals obtained from the data transmission system of FIG. 1.

The data transmission system of the invention utilizes the AC line frequency as a system clock, and derives from that AC line signal, the data signals for transmission between terminals in a multi-terminal computer system.

In the data transmission system herein specifically disclosed in FIG. 1, the AC signal is applied at an input terminal 10 and to the primary winding 12 of a transformer T. The lower end of primary winding 12 is connected to ground at 14. The secondary winding 16 of transformer T has a center tap 18 which is connected by a line 20 to an output terminal 22 at which the data signal is produced in a manner to be more completely described below. The load impedance at line 22 is indicated at RL.

The upper end of secondary winding 16 is connected through a diode D1 to a first switching means, here shown as a P-channel FET Q1, and the lower end of the secondary winding is connected through an opposite poled diode D2 to a second switching means, here shown as an N-channel FET Q2. More precisely stated, the upper end of secondary winding 16 is connected to the cathode of diode D1 and the anode of that diode is connected to the drain of FET Q1. The source of FET Q1 is connected to ground, and its gate is connected to the output of a NAND-gate 24. The lower end of secondary winding 16 is connected to the anode of diode D2, the cathode of which is in turn connected to the drain of FET Q2. The gate of FET Q2 is connected to ground, and the source of that device is connected to the output of a second NAND-gate 26.

The inputs to NAND-gates 24 and 26 are respectively the logic "1" and logic "0" data signals produced by the data processing sections of the particular terminal in which the data transmitter of the invention is contained. A logic "1" signal when present is applied to one input of gate 24, and a logic "0" signal when present is applied to one input of gate 26. Each gate also receives an enable signal from a line 28. When a logic "1" signal is present at the input of gate 24 along with an enable signal at line 28, a negative signal is produced at the output of gate 24 and FET Q1 is rendered conductive since its gate terminal becomes more negative than its grounded source terminal. For an input logic "0" signal at gate 26, a negative signal is derived at the output of that gate and FET Q2 is rendered conductive, since its gate, which is at ground, becomes more positive than its source to which the negative output signal of gate 26 is applied.

Thus for each of the possible input data signals to gates 24 and 26, one of FETs Q1 and Q2 is rendered conductive and a potential conductive path is provided between one of the ends of secondary winding 16 and ground; the upper end through diode D1 and the source-drain conduction path of FET Q1, and the lower end through diode D2 and the source-drain path of FET Q2 to ground at gate 26, in which a suitable ground connection is provided.

In the operation of the data transmission circuit of FIG. 1, the AC signal is introduced at line 10 onto the primary winding 12 of transformer T. As indicated by the dots in FIG. 1, a corresponding AC voltage is impressed upon the secondary winding having a polarity corresponding to the voltage on the primary winding. That is, the upper end of the secondary winding is of the same polarity as the upper or underground end of the primary winding. Assuming that a logic "1" signal is received from the information processing circuitry, FET Q1 is conductive as described above. For the positive half-cycle of the AC signal, diode D1 is reverse biased and thus not conductive, and the signal path from the secondary winding to ground is blocked by that diode. At the same time, since there is no logic "0" signal at the input of gate 26, FET Q2 is also in the non-conductive state so the lower end of the secondary winding 16 is also blocked from ground. As a result the signal produced at center tap 18 and thus at the output line 22 of the circuit is at ground. During the negative half-cycle of the AC line signal, still assuming the presence of a logic "1" input signal, diode D1 becomes conductive and the upper end of secondary winding 16 is connected through diode D1 and the drain-source path of FET Q1 to ground. The signal level at center tap 18 at this time is the positive cycle of an AC signal, as it reflects the signal at the lower end of the secondary winding which is the inverse of the signal at the upper end of that winding. Accordingly, a positive half-wave signal is produced at output line 22 corresponding to the presence of a logic "1" data signal.

The operation of the circuit is similar for the transmission of a logic "0" signal in which case FET Q2 becomes conductive while FET Q1 remains non-conductive For the positive half-cycle of the AC line signal at line 10, the lower end of secondary winding 16 is negative, and diode D2 is reverse-biased and thus non-conductive. Since FET Q1 is also nonconductive at this time due to the absence of a logic "1" signal at gate 24, a ground signal appears at center tap 18 and thus at line 22.

For the negative half-cycle of the input AC signal, diode D2 is forward-biased and conductive so that the lower end of secondary winding 16 is now connected to ground. Center tap 18 is now negative and a corresponding negative signal is caused to appear at line 22 reflecting a logic "0" signal. For a condition in which there is neither a logic "1" nor a logic "0" signal present from the information processing circuitry, both FETs Q1 and Q2 are in the non-conductive state and a resulting ground signal is present at the center tap 18 and output line 22.

Thus the signal at line 22 is a bipolar signal derived from the input AC signal and carrying data derived from the information processing circuitry in its associated computer terminal. A positive half-cycle of the signal on line 22 represents a logic "1" signal, and a negative half-cycle represents a logic "0" signal.

The output signal on line 22 is transmitted to one or more data receivers contained in other terminals of a multi-terminal system in which those signals are processed for use in subsequent data processing operations. A typical data receiving circuit for use with the transmitting system of FIG. 1 is illustrated in FIG. 2 in which the bipolar AC derived data signals are converted into logic "1" and logic "0" data output signals. That circuit comprises an input line 30 which receives the AC bipolar signals from the data transmitter. Line 30 has an equivalent input impedance indicated by resistor R1N and is connected through a resistor R1 to the input of a NOR gate 32, and through a resistor R2 to the input of FET Q3. A capacitor C1 is connected between resistor R1 and ground and performs a filtering operation on a received data signal, and a diode D3 is similarly connected to provide a clamping action to suppress negative inputs to gate 32. A capacitor C2 is connected between the junction of resistor R2 and the gate of FET Q3 and ground to filtering the input to the latter. The source of FET Q3 is connected to ground its drain is connected to one input of a NOR-gate 34. The drain of FET Q3 is also connected through a resistor R3 to a suitable power supply voltage VDD.

The output of NOR-gate 32 is connected to one input of a NOR-gate 36 the output of which is in turn connected as an input to NOR-gate 32. NOR-gate 32 and 36 thus define a first flip-flop 38. The output of NOR-gate 34 is applied to one input of NOR-gate 40 the output of which is in turn connected to an input of NOR-gate 34, gates 34 and 40 thus defining a second flip-flop 42. A reset signal is applied over line 44 to flip-flops 38 and 42 as an input to gates 36 and 40 respectively. The outputs of flip-flops 38 and 42 are applied to the input of an OR gate 46 to produce a data output at a line 48. Similarly, output lines 50 and 52 are respectively connected to the outputs of flip-flops 38 and 42 respectively to provide data signal outputs at logic "1" and logic "0" levels respectively.

The bipolar data input signal derived from the data transmission system of FIG. 1 is applied at line 30 and to the input of flip-flop 38 or flip-flop 42 depending on its logic sense. That is, a positive logic "1" signal is applied to the input of gate 32 of flip-flop 38 which thereupon changes its state, to thereby produce a corresponding logic "1" signal at line 50. For a logic "1" signal flip-flop 42 is unaffected since FET Q3 remains non-conductive. A negative logic "0" signal at line 30 is bypassed to ground through diode D3 and is applied to the gate of FET Q3 to render that device conductive. This in turn produces a signal at the input of gate 34 which in turn causes flip-flop 42 to change its state, thereby to produce a logic "0" signal at line 52. The output of gate 46 at lines 48 is thus either a logic "1" or logic "0" signal whichever is produced by the data receiving circuits in response to the received AC derived bipolar data signal.

The data transmission system of the present invention provides a multi-terminal computer system with the capability of producing and transmitting data signals in an efficient and reliable manner. The system operates by deriving bipolar data signals from the conventionally provided AC power line. Those data signals are then transmitted to and received at the other terminals in the system for processing thereat. The data transmitting system of the invention is economical and reliable since it requires a reduced number of components, and is also capable of producing high power signals often required for transmitting data from one terminal to a plurality of other terminals in a reliable manner. The system is thus highly suitable for use in commercial establishments and the like to enable data to be collected at various remote terminals for transmission to and processing at a central terminal.

While only a single embodiment of the present invention has been specifically described herein, it will be apparent that variations may be made therein without departure from the spirit and scope of the invention.

We claim:

1. In a digital data processing having at least first and second terminals, a system for transmitting digital data signals from one of said terminals to another of said terminals, said data transmitting system comprising an input terminal for receiving an AC signal, first and second nodes, means coupled to said input terminal and to said first and second nodes for establishing a true and inverse signal of said AC signal at said first and second nodes respectively, an output terminal, and means responsive to each bit of an applied digital input data signal for selectivity applying only one half-cycle of one of said true and inverse signals to said output terminal, thereby to develop at said output terminal an output data signal having successive positive-negative half-cycles which respectively correspond to the logic sense of each of said bits of said input digital data signals.

2. The data transmitting system of claim 1, further comprising a reference point, said signal applying means including means for coupling one of said first and second nodes to said reference point, and isolating the other of said nodes therefrom.

3. The data transmitting system of claim 2, in which said signal applying means comprises first and second switch means respectively coupled between said first and second nodes and said reference point, one of said first and second switch means being selectively actuated in response to each bit of said digital input data signal.

4. The data transmitting system of claim 1, in which said signal establishing means comprises transformer means having a primary winding coupled to said input terminal, a secondary winding having first and second ends respectively coupled to said first and second nodes, and a center tap of said secondary winding coupled to said output terminal.

5. The data transmitting system of claim 4, in which said signal applying means comprises first and second switch means respectively coupled to said first and second ends of said secondary winding, and means for selectively actuating one or the other of said switch means in response to successively applied bits of said input data signal.

6. The data transmitting system of claim 5, further comprising first and second oppositively poled diode means respectively coupled between said ends of said secondary winding and said first and second switch means.

7. In combination with the data transmitting system of claim 1, a receiving system in the other of said terminals comprising first and second switching stages each capable of operating at one of two discrete states, and means for applying the signal from said transmitting system to alter the state of one of said switching stages in response to the sense of the transmitted data signal.

8. In combination with the data transmitting system of claim 3, receiving system in the other of said terminals comprising first and second switching stages each capable of operating at one of two discrete states, and means for applying the signal from said transmitting system to alter the state of one of said switching stages in response to the sense of the transmitted data signal.

9. In combination with the data transmitting system of claim 5, a receiving system in the other of said terminals comprising first and second switching stages each capable of operating at one of two discrete states, and means for applying the signal from said transmitting system to alter the state of one of said switching stages in response to the sense of the transmitted data signal.

10. A digital data transmission system for transmitting synchronized digital data between at least first and second terminals of a digital processing apparatus, said transmissions system comprising:

transformer means having a primary and a center tapped secondary winding;

means for applying an AC high power synchronizing signal to said primary winding;

first and second switch means connected to each end of said secondary winding, one of said first and second switch means being responsive only to the presence of binary "1" bits, and the other of said first and second switch means being responsive only to the presence of binary "0" bits, a source for supplying an input digital data signal consisting of "1" and "0" bits, means for connecting said input digital data source to said first and second switch means;

an output terminal connected to said secondary winding; and means responsive to the operation of one of said first and second switch means for generating at said output terminal only one full half-cycle of a given polarity of the AC synchronizing signal as reflected across said transformer and responsive to the presence of a binary "1" bit, and for generating only one full half-cycle of a polarity opposite said given polarity of said AC synchronizing signal as reflected across said transformer and responsive to the presence of a binary "0" bit at said switch means.

* * * * *